United States Patent
Caveney

(10) Patent No.: US 8,316,050 B2
(45) Date of Patent: Nov. 20, 2012

(54) IDENTIFICATION AND AUTHORIZATION SYSTEM

(75) Inventor: Jack E. Caveney, North Palm Beach, FL (US)

(73) Assignee: Panduit Corp., Tinley Park, IL (US)

( * ) Notice: Subject to any disclaimer, the term of this patent is extended or adjusted under 35 U.S.C. 154(b) by 177 days.

(21) Appl. No.: 12/680,949

(22) PCT Filed: Oct. 3, 2008

(86) PCT No.: PCT/US2008/078718
§ 371 (c)(1),
(2), (4) Date: May 27, 2010

(87) PCT Pub. No.: WO2009/046278
PCT Pub. Date: Apr. 9, 2009

(65) Prior Publication Data
US 2010/0235382 A1   Sep. 16, 2010

Related U.S. Application Data

(60) Provisional application No. 60/977,677, filed on Oct. 5, 2007.

(51) Int. Cl.
*G06F 17/30* (2006.01)
(52) U.S. Cl. ............... 707/781; 707/783; 707/785
(58) Field of Classification Search ........... 707/781–788
See application file for complete search history.

(56) References Cited

U.S. PATENT DOCUMENTS

| | | | |
|---|---|---|---|
| 5,224,173 A | 6/1993 | Kuhns et al. | |
| 5,873,096 A | 2/1999 | Lim et al. | |
| 5,930,764 A | 7/1999 | Melchione et al. | |
| 6,018,739 A | 1/2000 | McCoy et al. | |
| 6,208,264 B1 | 3/2001 | Bradney et al. | |
| 6,697,947 B1 * | 2/2004 | Matyas et al. | 713/182 |
| 7,711,152 B1 * | 5/2010 | Davida et al. | 382/115 |
| 8,024,269 B1 * | 9/2011 | Ballard | 705/40 |
| 2002/0010857 A1 | 1/2002 | Karthik | |
| 2002/0062291 A1 * | 5/2002 | Zoka | 705/64 |
| 2002/0087858 A1 * | 7/2002 | Oliver et al. | 713/156 |
| 2004/0015702 A1 * | 1/2004 | Mercredi et al. | 713/182 |
| 2004/0025046 A1 * | 2/2004 | Blume | 713/200 |
| 2004/0059953 A1 * | 3/2004 | Purnell | 713/202 |
| 2004/0172535 A1 * | 9/2004 | Jakobsson et al. | 713/168 |
| 2004/0207511 A1 * | 10/2004 | McEwan | 340/5.61 |
| 2005/0097037 A1 | 5/2005 | Tibor | |
| 2005/0210269 A1 * | 9/2005 | Tiberg | 713/186 |
| 2006/0078171 A1 * | 4/2006 | Govindaraju et al. | 382/115 |
| 2007/0043594 A1 * | 2/2007 | Lavergne | 705/2 |
| 2008/0162943 A1 * | 7/2008 | Ali et al. | 713/185 |

\* cited by examiner

*Primary Examiner* — Hanh Thai
(74) *Attorney, Agent, or Firm* — Robert A. McCann; Christopher S. Clancy; Zachary J. Smolinski

(57) ABSTRACT

An identification and authorization system is provided that utilizes a national ID database and a number of application-specific databases. The national ID database contains unique individual ID numbers linked to unique biometric codes. The application-specific databases contain an applicable portion of the same unique individual ID numbers that are contained in the national ID database. To complete a transaction, a credential such as an ID card is scanned and a biometric scan of the individual is completed. The transaction information and the individual ID number is sent to the appropriate application-specific database. Verification of identity is completed at the national ID database, which compares the biometric code of the biometric scan with the biometric code linked to the unique individual ID number. A response from the application-specific database and a response from the national ID database is sent to the scanning location.

9 Claims, 1 Drawing Sheet

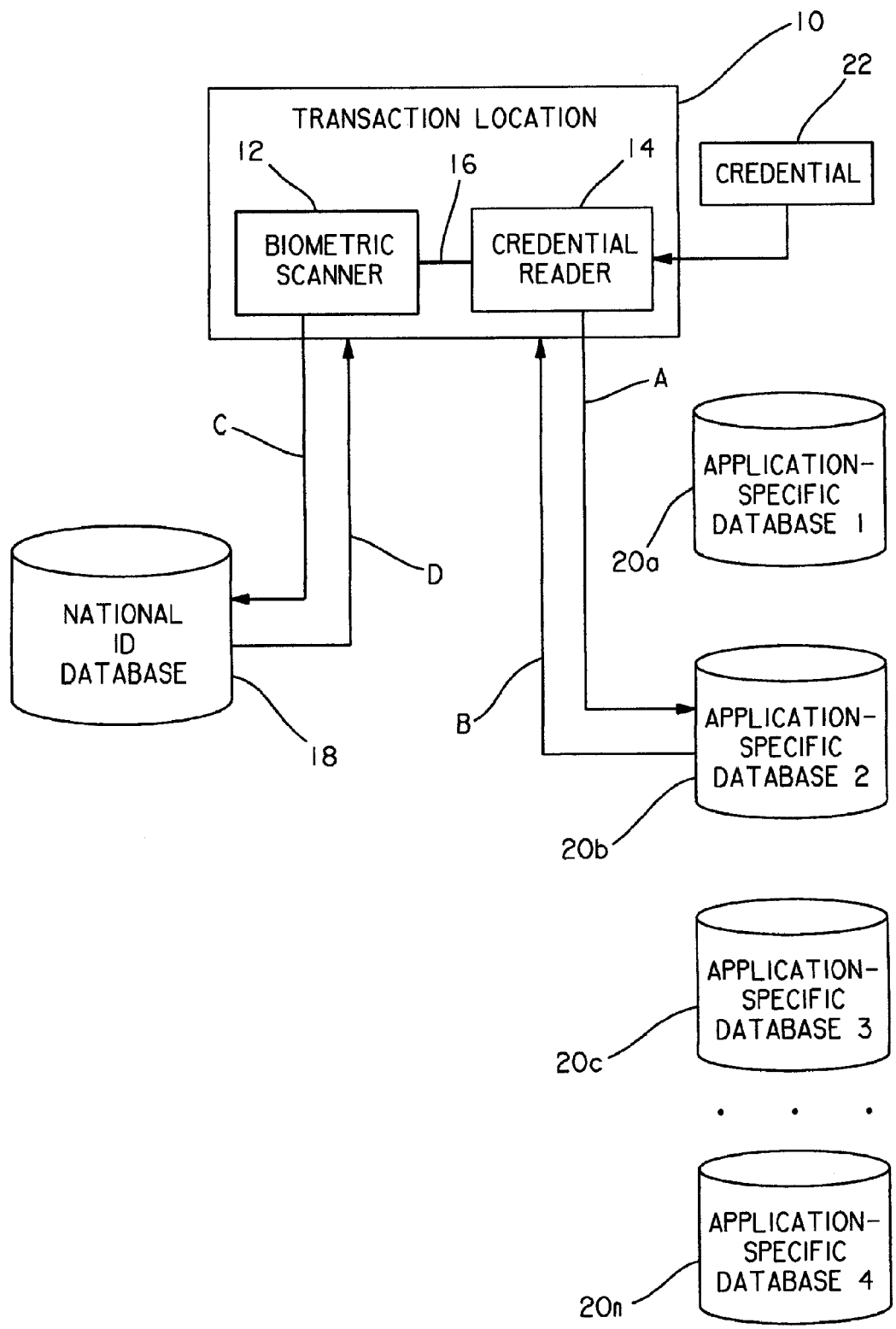

IDENTIFICATION AND AUTHORIZATION SYSTEM

BACKGROUND OF THE INVENTION

The integrity of individual identification (ID) is required for many critical applications. Applications such as security, immigration, and voting all benefit from the reliable identification of individuals.

Many current identification systems rely on ID credentials, such as ID cards and credit cards, that may be counterfeited or otherwise compromised, either intentionally or by mistake. For example, it is possible for an "identity thief" to replicate or steal ID credentials and pass himself off as another individual. Similarly, lost or improperly disposed-of ID documents may provide opportunities for ID credentials to be misused.

There is a need for a more reliable system of personal identification that cannot be compromised by improper use of ID credentials.

SUMMARY OF THE INVENTION

According to one embodiment of the present invention, a national ID database is provided that correlates unique individual ID numbers with individuals' biometric code data. Application-specific databases are also provided, containing the unique individual ID numbers that are also contained in the national ID database. When a transaction, such as voting or using a credit card, is initiated, the individual supplies a credential such as a voter ID card or a credit card. Also, a biometric reading, such as a thumbprint of the individual, is scanned at the time of the transaction.

To continue a transaction, the unique individual ID number and information about the transaction are forwarded to an application-specific database, which can approve the transaction contingent upon ID verification.

The national ID database is separately employed to verify the individual's ID. This is accomplished by sending a biometric code, such as a thumbprint code, and the unique individual ID number to the national ID database. Upon receiving the biometric code and the unique individual ID number information, the national ID database can confirm or deny that the biometric code corresponds to the unique individual ID number.

Systems and methods according to the present invention provide integrity of individual ID information, in combination with authorization for many diverse applications including security, immigration, social security, voting, and credit card purchases.

BRIEF DESCRIPTION OF THE DRAWINGS

FIG. 1 is a system schematic diagram showing components and communication connections between the components of an identification and authorization system according to one embodiment of the present invention.

DETAILED DESCRIPTION OF THE ILLUSTRATED EMBODIMENT

FIG. 1 shows an identification and authorization system according to one embodiment of the present invention. Systems and methods of the present invention are intended to correctly identify individuals, as well as guarantee correct authorization for individuals to carry out a variety of transactions at transaction locations 10. The transaction location 10 in the following example will be a store, such as a department store, but transaction locations according to the present invention may include a number of different locations, such as: immigration offices, social security offices, department of motor vehicle offices, polling places, banks, and the like.

Each transaction location 10 is provided with a biometric scanner 12 and a credential reader 14. The biometric scanner may be a thumbprint reader, a hand or fingerprint scanner, a retinal scanner, or any other device adapted to gather and transmit biometric information associated with an individual. The biometric scanner is preferably adapted to transform the results of a biometric scan into a biometric code that is indicative of the information gathered during the biometric scan. The credential reader may be an optical or magnetic scanner adapted to gather and transmit information related to a credential such as an identification card or a credit card. A link 16 is provided between the biometric scanner 12 and the credential reader 14.

In an alternative embodiment, the biometric scanner 12 and the credential reader 14 are combined into a combination biometric scanner and credential reader.

A national ID database 18 is provided. The national ID database 18 contains correlations between unique individual ID numbers and individuals' biometric codes. Each unique individual ID number is associated with only one individual. Several types of biometric codes may be associated with an individual. For example, there may be a first code for a thumbprint scan, a second code for a hand scan, and a third code for a retinal scan. Each individual, however, will have only one of each type of biometric code associated with his or her individual ID number. Thus, when the national ID database 18 receives a biometric code for verification, the national ID database 18 should be able to associate only one unique individual ID number with that specific biometric code.

Several application-specific databases 20a-20n are used in systems and methods according to the present invention. The application-specific databases 20a-20n are provided in diverse locations for diverse applications. The application-specific databases 20a-20n are similar to existing application databases which control diverse applications; however, the application-specific databases 20a-20n also contain the unique individual ID numbers of individuals which are recorded in the national ID database 18.

A credential 22 is provided to every authorized individual. The credential may be application-specific, and it contains the same unique individual ID number and biometric code information which is recorded in the national ID database 18 in machine-readable form.

An explanation of the system in operation will now be provided, using the example of a purchase in a store. An individual wishing to complete a transaction provides a credential 22 at the transaction location 10. In the present example, the credential 22 is a credit card, which is scanned by the credential reader 14. Information regarding the transaction (for example, the items purchased and the total price) and the unique individual ID number are provided to an application-specific database 20b as shown by arrow "A." If the transaction is approved by the application-specific database 20b contingent upon ID verification, the transaction location 10 is notified, as shown by arrow "B." This notification may be provided directly to the credential reader 14.

Following scanning of the credential, a biometric scan (such as a thumbprint scan) of the individual is performed, and the unique individual ID number and the biometric code from the scan are transmitted to the national ID database 18 for verification, as shown by arrow "C." If the ID is verified by the national ID database 18, the transaction location 10 is notified (as shown by arrow "D") and the transaction is approved. Notification of the approval may be sent directly to the biometric scanner 12. If the ID is not verified, the transaction location 10 is similarly notified of the failure.

If the ID is not verified, if so coded for the application, the national ID database system will initiate a search in an attempt to determine the identity of the biometric information that was scanned, and the results will be transmitted to the biometric scanner 12. This could be utilized for applications such as social security, passports, and driver's licenses.

If the ID is not verified, and if so coded for the application, the biometric scanner 12 (or combined biometric/credential scanning device) will notify the relevant application-specific database, and the database will handle that information accordingly. For example, if the application were a charge on a credit card, the charge would be denied.

According to one embodiment of the present invention, each individual that wants to be registered in the national ID database must obtain a national ID card. Creation of this card should be similar to the creation of a driver's license. The card would contain the name and other identifying information of the individual and, in machine-readable form, the biometric code information and unique individual ID number which is recorded in the national ID database 18. This card would be produced locally and could be created utilizing modified state driver's license facilities. The national ID card would be utilized to issue application-specific cards for each authorized application.

For a governmental entity to implement an identification and authorization system according to the present invention, several types of legislation would be required. This legislation would include:
1. A National Technical Standard of unique individual ID numbers, biometric codes, and transmission and storage specifications (including encryption standards).
2. Funding to create and sustain a National ID/Biometric database.
3. Funding to create and sustain local facilities to create individual ID cards.

The advantages of the present system include:
1. It provides integrity to individual ID information.
2. It vastly improves productivity.
3. It utilizes state-of-the-art technology.
4. A screen reply and/or printout can be provided.
5. The separate database for each application minimizes the file sizes and allows local control.
6. Applications could include:
    Social Security Cards
    Driver's Licenses
    Passports
    Voting Registration Cards
    Security Clearance
    Access
    Entrance
    Credit While particular embodiments and applications of the present invention have been illustrated and described, it is to be understood that the invention is not limited to the precise construction and compositions disclosed herein and that various modifications, changes, and variations may be apparent from the foregoing descriptions without departing from the spirit and scope of the invention. For example, while the term "national database" is used herein, it is to be understood that the national database may be replaced with a central database that contains ID numbers and biometric codes organized on a basis other than a nation. For example, a central database may be used for a municipality, a state, a continent, or the world.

The invention claimed is:

1. A system for identifying individuals and authorizing individuals to carry out transactions said system comprising:
    a plurality of credentials, each of said credentials being provided to one of a plurality of individuals;
    a biometric scanner and a credential reader at a transaction location, said biometric scanner transforming the results of a biometric scan into a biometric code, said credential reader gathering and transmitting information related to said credentials, including a unique individual ID number;
    a link between said biometric scanner and said credential reader;
    a national ID database containing correlations between said unique individual ID numbers and individual biometric codes; and
    at least one application-specific database related to a specific transaction type, said application-specific database containing ID numbers of individuals authorized to participate in said specific transaction type;
    wherein said national ID database is separate from and lacks direct communication with said at least one application-specific database; and
    wherein authorization to carry out a transaction is provided by verification from the national ID database and the application-specific database following transmission of said biometric code and said credential information to said national ID database and transmission of said unique ID number to said application-specific database.

2. The system of claim 1 wherein said plurality of credentials comprise credit cards.

3. The system of claim 1 wherein said plurality of credentials comprise ID cards.

4. The system of claim 1 wherein said biometric scanner is selected from the group consisting of a thumbprint reader, a fingerprint reader, a hand scanner, and a retinal scanner.

5. The system of claim 1 wherein said application-specific database is selected from the group consisting of a credit database, an access database, a voting registration database, a Social Security database, a driver's license database, a passport database, a security database, and a voting registration database.

6. The system of claim 1 wherein said biometric scanner and said credential reader are combined into one device.

7. A method for verifying identification of an individual for completing a transaction, said method comprising:
    accepting a credential from said individual at a transaction location;
    scanning said credential at a credential reader to acquire a unique individual ID number from said credential;
    transmitting information regarding said transaction to an application-specific database;
    verifying at said application-specific database whether said individual is authorized to complete said transaction based upon ID verification;
    denying said transaction if said verification at said application-specific database is unsuccessful;
    completing a biometric scan of said individual at said transaction location to acquire a biometric code if said verification at said application-specific database is successful;

transmitting to a national ID database for verification said unique individual ID number and said biometric code from said biometric scan, wherein said national ID database is separate from and lacks direct communication with said at least one application-specific database;

attempting to verify at said national ID database a correlation between said unique individual ID number and said biometric code;

approving said transaction if said verification at said national ID database is successful; and denying said transaction if said verification at said national ID database is unsuccessful.

8. The method of claim 7 further comprising initiating a search at said national ID database to determine the identity of the biometric infoiniation that was scanned during said biometric scan.

9. The method of claim 7 wherein completing said biometric scan comprises completing a scan selected from the group consisting of a thumbprint scan, a fingerprint scan, a handprint scan, and a retinal scan.

* * * * *

UNITED STATES PATENT AND TRADEMARK OFFICE
CERTIFICATE OF CORRECTION

| | | |
|---|---|---|
| PATENT NO. | : 8,316,050 B2 | Page 1 of 1 |
| APPLICATION NO. | : 12/680949 | |
| DATED | : November 20, 2012 | |
| INVENTOR(S) | : Jack E. Caveney | |

It is certified that error appears in the above-identified patent and that said Letters Patent is hereby corrected as shown below:

In the Claims:

Column 6, line 3 which reads "the biometric infoiniation that was scanned during said" should read "the biometric information that was scanned during said".

Signed and Sealed this
Twenty-fifth Day of February, 2014

Michelle K. Lee
*Deputy Director of the United States Patent and Trademark Office*